United States Patent
Ang

(10) Patent No.: US 8,285,433 B2
(45) Date of Patent: Oct. 9, 2012

(54) VEHICLE CONTROL DEVICE, VEHICLE CONTROL METHOD, AND RECORDING MEDIUM HAVING PROGRAM RECORDED THEREON

(75) Inventor: Wanleng Ang, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 733 days.

(21) Appl. No.: 12/310,482

(22) PCT Filed: Aug. 3, 2007

(86) PCT No.: PCT/JP2007/065684
§ 371 (c)(1),
(2), (4) Date: Feb. 26, 2009

(87) PCT Pub. No.: WO2008/038466
PCT Pub. Date: Apr. 3, 2008

(65) Prior Publication Data
US 2009/0326750 A1   Dec. 31, 2009

(30) Foreign Application Priority Data
Sep. 28, 2006  (JP) ................ 2006-264802

(51) Int. Cl.
*B60L 9/00* (2006.01)
(52) U.S. Cl. .......................................... 701/22
(58) Field of Classification Search ......... None
See application file for complete search history.

(56) References Cited

U.S. PATENT DOCUMENTS

| 5,983,154 A | 11/1999 | Morisawa |
| 6,314,347 B1 * | 11/2001 | Kuroda et al. .................. 701/22 |
| 6,814,170 B2 * | 11/2004 | Abe et al. .................. 180/65.25 |
| 7,349,797 B2 * | 3/2008 | Donnelly et al. ............. 701/115 |
| 7,512,489 B2 * | 3/2009 | Endo et al. .................... 701/414 |
| 8,099,236 B2 * | 1/2012 | Olson et al. ............. 340/995.13 |
| 2008/0097684 A1 * | 4/2008 | Syed et al. .................... 701/106 |
| 2009/0101421 A1 * | 4/2009 | Oyobe et al. ............... 180/65.29 |
| 2010/0010697 A1 * | 1/2010 | Soma et al. .................... 701/22 |

FOREIGN PATENT DOCUMENTS

JP   A-7-107617   4/1995

(Continued)

OTHER PUBLICATIONS

Office Action issued in corresponding Japanese Patent Application No. 2008-536300, mailed Oct. 26, 2010. (with English-language translation).

*Primary Examiner* — Thomas Tarcza
*Assistant Examiner* — Nagi Murshed
(74) *Attorney, Agent, or Firm* — Oliff & Berridge, PLC

(57) ABSTRACT

A vehicle control method having an HV driving mode in which operation of an internal combustion engine is permitted and an EV driving mode in which a vehicle is driven by using a motor with the internal combustion engine stopped includes the steps of: setting a destination; setting a driving route from a starting point to the destination; dividing the driving route and associating any of the driving modes with each section of the divided driving route; fixing the division of the driving route and the driving mode associated with each section based on an instruction from an operator; and causing the vehicle to travel each section in the associated driving mode.

16 Claims, 4 Drawing Sheets

FOREIGN PATENT DOCUMENTS

| | | |
|---|---|---|
| JP | A 9-147294 | 6/1997 |
| JP | A 9-259397 | 10/1997 |
| JP | A 11-192904 | 7/1999 |
| JP | A-2000-234937 | 8/2000 |
| JP | A-2000-324609 | 11/2000 |
| JP | A-2000-333305 | 11/2000 |
| JP | A-2003-23703 | 1/2003 |
| JP | A-2003-235108 | 8/2003 |
| JP | A-2003-333705 | 11/2003 |
| JP | A-2004-248455 | 9/2004 |
| JP | A-2005-143158 | 6/2005 |
| JP | A-2005-348524 | 12/2005 |

* cited by examiner

VEHICLE CONTROL DEVICE, VEHICLE CONTROL METHOD, AND RECORDING MEDIUM HAVING PROGRAM RECORDED THEREON

TECHNICAL FIELD

The present invention relates to a vehicle control device, a vehicle control method, a program, and a recording medium having the program recorded thereon.

BACKGROUND ART

In recent years, hybrid vehicles having an engine and a motor mounted thereon as a driving device have received attention as environmentally-friendly vehicles. Regarding these hybrid vehicles, Japanese Patent Laying-Open No. 2000-333305 discloses a driving control apparatus of a hybrid vehicle wherein a route to a destination is divided into a plurality of sections, a vehicle speed pattern is estimated for each section on the basis of a road condition of the route to the destination and a driving history of a driver, and an operating schedule of an engine and a motor for each section is set so as to minimize fuel consumption to the destination.

In the art disclosed in foregoing Japanese Patent Laying-Open No. 2000-333305, however, the operating schedule for each section that the vehicle travels is automatically set and cannot be precisely tailored to the driver's preferences.

Though fuel efficiency of hybrid vehicles has been improved with the advancement of technology, it is preferable that drivers also have an awareness of fuel-efficient driving. In order to raise awareness of the drivers about fuel-efficient driving, it is more desirable that the drivers can also participate in setting of an operating schedule of an engine and a motor of a hybrid vehicle.

DISCLOSURE OF THE INVENTION

An object of the present invention is to provide a control device for a hybrid vehicle in which a driving pattern can be precisely tailored to the drivers' preferences, a control method, a program for causing a computer to execute the control method, and a recording medium having the program recorded thereon.

In summary, the present invention provides a vehicle control device having a plurality of driving modes. The vehicle control device includes a destination setting portion setting a destination, a route setting portion setting a driving route from a starting point to the destination, a driving route dividing portion dividing the driving route, a driving mode fixing portion fixing a driving mode by associating any of the driving modes with each section of the divided driving route based on an instruction from an operator, and a driving control portion causing a vehicle to travel each section in the associated driving mode.

Preferably, the vehicle is a hybrid vehicle driven by using an internal combustion engine and a motor. The plurality of driving modes include an HV driving mode in which operation of the internal combustion engine is permitted, and an EV driving mode in which the vehicle is driven by using the motor with the internal combustion engine stopped.

Preferably, the vehicle control device further includes an information reading portion reading information including the destination, the driving route, each divided section, and the driving mode associated with each section from outside the vehicle. The driving control portion is configured such that the vehicle can travel based on the information.

Preferably, the driving route dividing portion divides the driving route from the starting point to the destination into sections appropriate for each of the plurality of driving modes and provisionally decides a driving mode for each divided section. The driving mode fixing portion changes the driving mode associated with each section into another driving mode based on the instruction from the operator.

Preferably, the driving mode fixing portion changes a position of a boundary point at which the driving route is divided, based on an input by the operator.

According to another aspect of the present invention, there is provided a vehicle control device having a plurality of driving modes. The vehicle control device includes a setting portion setting a destination, a setting portion setting a driving route from a starting point to the destination, a dividing portion dividing the driving route, a fixing portion fixing a driving mode by associating any of the driving modes with each section of the divided driving route based on an instruction from an operator, and a driving control portion causing a vehicle to travel each section in the associated driving mode.

Preferably, the vehicle is a hybrid vehicle driven by using an internal combustion engine and a motor. The plurality of driving modes include an HV driving mode in which operation of the internal combustion engine is permitted, and an EV driving mode in which the vehicle is driven by using the motor with the internal combustion engine stopped.

Preferably, the vehicle control device further includes a reading portion reading information including the destination, the driving route, each divided section, and the driving mode associated with each section from outside the vehicle. The driving control portion causing a vehicle to travel is configured such that the vehicle can travel based on the information.

Preferably, the dividing portion divides the driving route from the starting point to the destination into sections appropriate for each of the plurality of driving modes and provisionally decides a driving mode for each divided section. The fixing portion changes the driving mode associated with each section into another driving mode based on the instruction from the operator.

Preferably, the fixing portion changes a position of a boundary point at which the driving route is divided, based on an input by the operator.

According to still another aspect of the present invention, there is provided a vehicle control method having a plurality of driving modes. The vehicle control method includes the steps of: setting a destination; setting a driving route from a starting point to the destination; dividing the driving route; fixing a driving mode by associating any of the driving modes with each section of the divided driving route based on an instruction from an operator; and causing a vehicle to travel each section in the associated driving mode.

Preferably, the vehicle is a hybrid vehicle driven by using an internal combustion engine and a motor. The plurality of driving modes include an HV driving mode in which operation of the internal combustion engine is permitted, and an EV driving mode in which the vehicle is driven by using the motor with the internal combustion engine stopped.

Preferably, the vehicle control method further includes the step of reading information including the destination, the driving route, each divided section, and the driving mode associated with each section from outside the vehicle. In the step of causing a vehicle to travel, the vehicle is caused to travel based on the information.

Preferably, in the step of dividing the driving route, the driving route from the starting point to the destination is divided into sections appropriate for each of the plurality of driving modes and a driving mode for each divided section is provisionally decided. In the step of fixing a driving mode, the driving mode associated with each section is changed into another driving mode based on the instruction from the operator.

Preferably, in the step of fixing a driving mode, a position of a boundary point at which the driving route is divided is changed based on an input by the operator.

In a further aspect, the present invention provides a computer-readable recording medium having a program for causing a computer to execute any of the above-described vehicle control methods recorded thereon.

In a further aspect, the present invention provides a program for causing a computer to execute any of the above-described vehicle control methods.

According to the present invention, the driving pattern can be precisely tailored to the drivers' preferences and awareness of the drivers about energy conservation is raised. In addition, the drivers can try various driving patterns. Therefore, enhancement of fuel efficiency can also be expected.

BEST MODES FOR CARRYING OUT THE INVENTION

Figure 1:
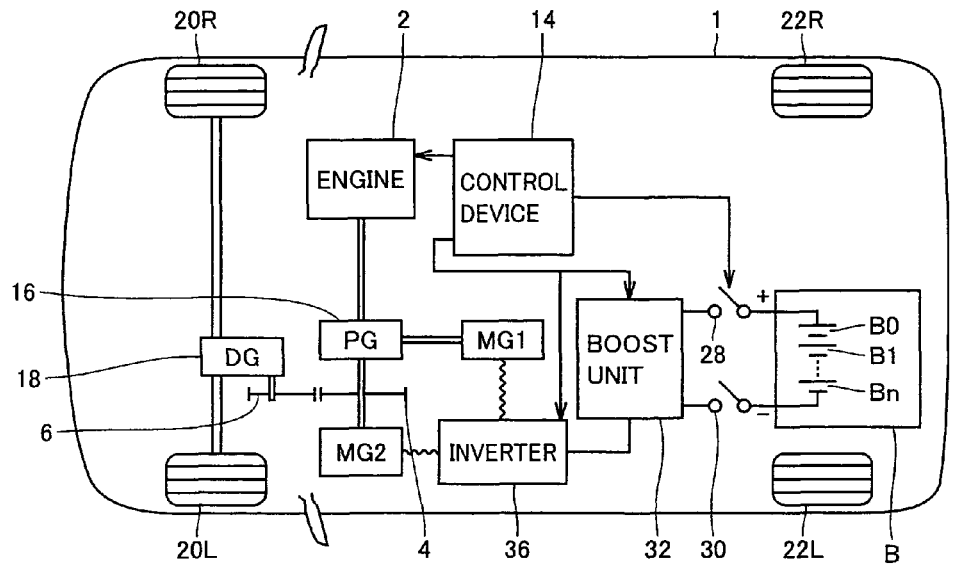
FIG. 1 is a diagram of a main configuration of a hybrid vehicle 1 of the present embodiment.

The embodiments of the present invention will be described in detail hereinafter with reference to the drawings, wherein the same or corresponding parts are represented by the same reference characters, and the description thereof will not be repeated.

FIG. 1 is a diagram of a main configuration of a hybrid vehicle 1 of the present embodiment. Hybrid vehicle 1 is a vehicle that is driven by using an engine and a motor.

Referring to FIG. 1, hybrid vehicle 1 includes front wheels 20R and 20L, rear wheels 22R and 22L, an engine 2, a planetary gear 16, a differential gear 18, and gears 4 and 6.

Hybrid vehicle 1 further includes a battery B located at the vehicle rear, a boost unit 32 boosting direct current (DC) electric power output by battery B, an inverter 36 receiving and transmitting the DC electric power from/to boost unit 32, a motor generator MG1 coupled to engine 2 with planetary gear 16 being interposed and mainly generating electric power, and a motor generator MG2 having a rotation shaft connected to planetary gear 16. Inverter 36 is connected to motor generators MG1 and MG2, and performs conversion between alternating current (AC) electric power and the DC electric power from boost unit 32.

Planetary gear 16 has first to third rotation shafts. The first rotation shaft is connected to engine 2, the second rotation shaft is connected to motor generator MG1, and the third rotation shaft is connected to motor generator MG2.

This third rotation shaft has gear 4 attached thereto, and this gear 4 transfers motive power to differential gear 18 by driving gear 6. Differential gear 18 transfers the motive power received from gear 6 to front wheels 20R and 20L, and transfers torque of front wheels 20R and 20L to the third rotation shaft of the planetary gear via gears 6 and 4.

Planetary gear 16 serves to divide motive power among engine 2, motor generators MG1 and MG2. In other words, if rotation of the two rotation shafts out of the three rotation shafts of planetary gear 16 is defined, rotation of the remaining one rotation shaft is forcibly decided. Therefore, a vehicle speed is controlled by controlling the amount of electric power generated at motor generator MG1 and driving motor generator MG2 while operating engine 2 most efficiently. As a result, an energy-efficient car as a whole is realized.

It should be noted that a reduction gear reducing rotation of motor generator MG2 and transferring the reduced rotation to planetary gear 16, or a transmission gear allowing change of the reduction ratio of the reduction gear may be provided.

Battery B serving as a DC power supply includes a secondary battery such as a nickel hydride battery or a lithium ion battery. Battery B supplies DC electric power to boost unit 32, and is charged with DC electric power from boost unit 32.

Boost unit 32 boosts a DC voltage received from battery B and supplies the boosted DC voltage to inverter 36. Inverter 36 converts the supplied DC voltage into an AC voltage, and controls driving of motor generator MG1 at the time of startup of the engine. Furthermore, after startup of the engine, AC electric power generated by motor generator MG1 is converted into DC by inverter 36, and the DC is converted into a voltage appropriate for charging of battery B by boost unit 32 to charge battery B.

Inverter 36 also drives motor generator MG2. Motor generator MG2 assists engine 2 and drives front wheels 20R and 20L. At the time of braking, the motor generator performs regenerative operation and converts rotational energy of the wheels into electrical energy. The obtained electrical energy is returned to battery B via inverter 36 and boost unit 32. Battery B is an assembled battery and includes a plurality of battery units B0-Bn connected in series. System main relays 28 and 30 are provided between boost unit 32 and battery B, and a high voltage is cut off while the vehicle is not driven.

Hybrid vehicle 1 further includes a control device 14. Control device 14 controls engine 2, inverter 36, boost unit 32, and system main relays 28 and 30 in accordance with instructions by the driver and outputs from various sensors attached to the vehicle.

Figure 2:
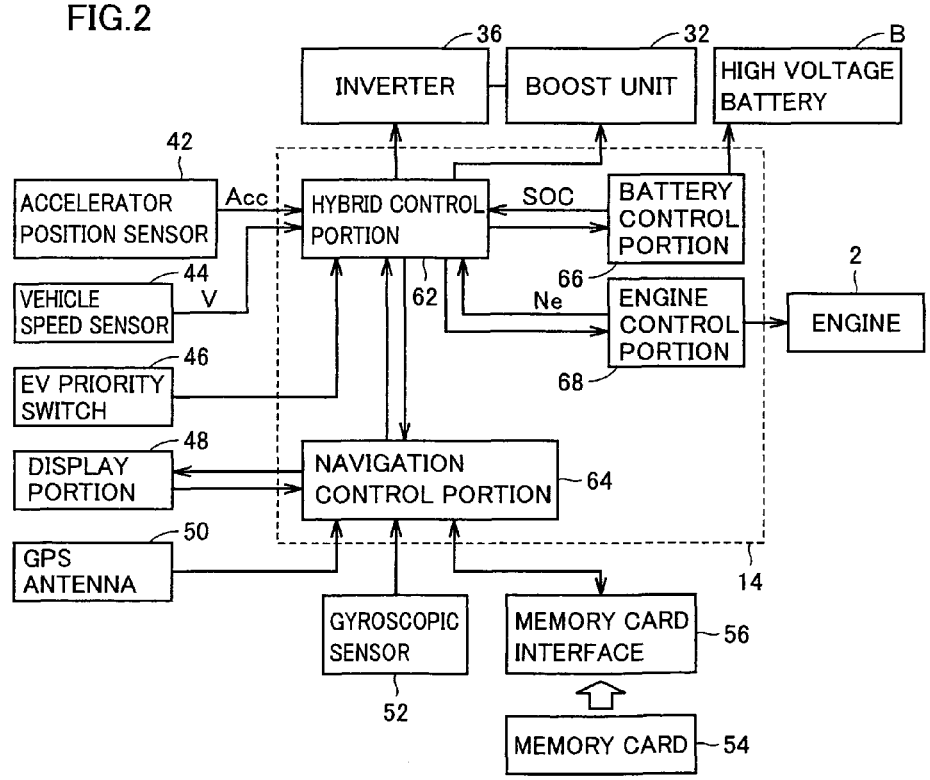
FIG. 2 is a diagram of peripheral devices related to functional blocks of a control device 14 in FIG. 1.

FIG. 2 is a diagram of peripheral devices related to functional blocks of control device 14 in FIG. 1. It should be noted that this control device 14 can be implemented by any of software and hardware.

Referring to FIG. 2, control device 14 includes a hybrid control portion 62, a navigation control portion 64, a battery control portion 66, and an engine control portion 68.

Battery control portion 66 determines a state of charge SOC of battery B, for example, by integrating charging and discharging currents of battery B, and transmits this SOC to hybrid control portion 62.

Engine control portion 68 controls a throttle of engine 2. Furthermore, engine control portion 68 detects an engine rotation speed Ne of engine 2 and transmits engine rotation speed Ne to hybrid control portion 62.

Navigation control portion 64 obtains information about a destination set by the driver or a passenger from a display portion 48 including a touch display. Furthermore, navigation control portion 64 grasps a current position of the vehicle by using a GPS antenna 50 and a gyroscopic sensor 52, and causes display portion 48 to display the current position over road map data. In addition, navigation control portion 64 carries out a navigation operation to search for and display a driving route from the current position to the destination.

Hybrid control portion 62 calculates an output required by the driver (required power) based on an output signal Acc of an accelerator position sensor 42 and a vehicle speed V detected by a vehicle speed sensor. In addition to this required power by the driver, hybrid control portion 62 calculates necessary driving power (total power) in consideration of state of charge SOC of battery B, and further calculates a rotation speed required for the engine and power required for the engine.

Hybrid control portion 62 transmits the required rotation speed and the required power to engine control portion 68, and causes engine control portion 68 to control the throttle of engine 2.

Hybrid control portion 62 calculates torque required by the driver in accordance with a driving condition, causes inverter 36 to drive motor generator MG2, and causes motor generator MG1 to generate electric power as needed.

Driving power of engine 2 is divided into power for directly driving the wheels and power for driving motor generator MG1. The driving power of the vehicle is the sum of driving power of motor generator MG2 and power directly obtained from the engine.

Furthermore, an EV priority switch 46 is provided in this vehicle. When the driver presses this EV priority switch 46, actuation of the engine is limited. As a result, a driving mode of the vehicle is set to an EV driving mode in which the vehicle is driven only by the driving power of motor generator MG2. The EV driving mode is suited to reduce noise in a built-up area in the middle of the night or in the early morning as well as to reduce exhaust gas in an indoor parking lot or a garage. In contrast, a normal driving mode in which the use of the engine is permitted is referred to as an HV driving mode. In other words, a plurality of driving modes include the HV driving mode in which operation of an internal combustion engine is permitted and the EV driving mode in which the vehicle is driven by using the motor with the internal combustion engine stopped.

The EV driving mode is automatically cleared when any of the following conditions is satisfied: 1) EV priority switch 46 is turned off; 2) state of charge SOC of the battery decreases below a prescribed value; 3) the vehicle speed exceeds a prescribed value; and 4) an accelerator opening degree exceeds a defined value.

Navigation control portion 64 outputs to hybrid control portion 62 a signal that replaces turning on/off of this EV priority switch 46, which will be described in detail hereinafter.

Navigation control portion 64 performs a setting process of setting a destination based on operation by the driver or the passenger, and a searching process of setting a driving route from a starting point to the destination.

Navigation control portion 64 performs a process of dividing the obtained driving route and associating any of the driving modes with each section of the divided driving route as will be described hereinafter in connection with FIG. 5. Then, in order to check whether this association suits the user's preferences, navigation control portion 64 performs a process of fixing the division of the driving route and the driving mode associated with each section based on an instruction from the operator. In this case, the user can also change the division into sections and the driving mode manually. Then, this fixed division into sections and the corresponding driving mode are stored. Thereafter, upon initiation of driving, navigation control portion 64 transmits information about the driving mode to hybrid control portion 62 and causes the vehicle to travel each section in the associated driving mode.

In navigation control portion 64, a memory card interface 56 is provided as a reading portion reading information including the destination, the driving route, each divided section, and the driving mode associated with each section from outside the vehicle. Data created by a not-shown personal computer and stored in advance in a memory card 54 can be read into navigation control portion 64 via memory card interface 56.

As a result, control device 14 causing the vehicle to travel is configured such that the vehicle can travel based on the data.

Navigation control portion 64 divides the driving route from the starting point to the destination into sections appropriate for each of the plurality of driving modes. Any of the EV driving mode and the HV driving mode is selected, for example, in accordance with the surrounding environment of a road, inclinations of a road, whether there are curves or not on a road, whether there are traffic signals or not on a road, or the like. It should be noted that, in a vehicle having a transmission that can switch a range, the range may be switched in addition to such setting of the driving mode.

Furthermore, navigation control portion 64 also performs a process of changing the driving mode associated with each section into another driving mode based on the instruction from the operator. Similarly, navigation control portion 64 also performs a process of changing a position of a boundary point at which the driving route is divided based on an input by the operator.

Control device 14 described in connection with FIG. 2 can also be implemented by software by using a computer.

Figure 3:
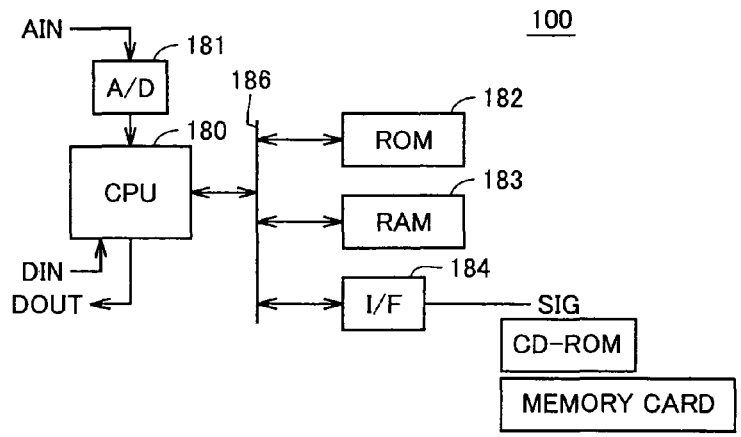
FIG. 3 is a diagram of a general configuration where a computer 100 is used as control device 14.

FIG. 3 is a diagram of a general configuration where a computer 100 is used as control device 14.

Referring to FIG. 3, computer 100 includes a CPU 180, an A/D converter 181, a ROM 182, a RAM 183, and an interface portion 184.

A/D converter 181 converts an analog signal AIN such as an output from various sensors into a digital signal and outputs the digital signal to CPU 180. Furthermore, CPU 180 is connected to ROM 182, RAM 183 and interface portion 184 via a bus 186 such as a data bus and an address bus, and receives and transmits data.

Data such as a program executed at CPU 180 or a map referred to at CPU 180 is stored in ROM 182. RAM 183 is, for example, a work area used in the case where CPU 180 processes data, and temporarily stores data such as various variables.

For example, interface portion 184 communicates with another ECU (Electric Control Unit), inputs rewritten data in the case where electrically-rewritable flash memory or the like is used as ROM 182, or reads a data signal SIG from a computer-readable recording medium such as a memory card or a CD-ROM.

It should be noted that CPU 180 receives and transmits a data input signal DIN or a data output signal DOUT from an input/output port.

Control device 14 is not limited to such a configuration, but may be implemented to include a plurality of CPUs. Furthermore, each of hybrid control portion 62, navigation control portion 64, battery control portion 66, and engine control portion 68 in FIG. 2 may have a configuration as in FIG. 3.

Figure 4:
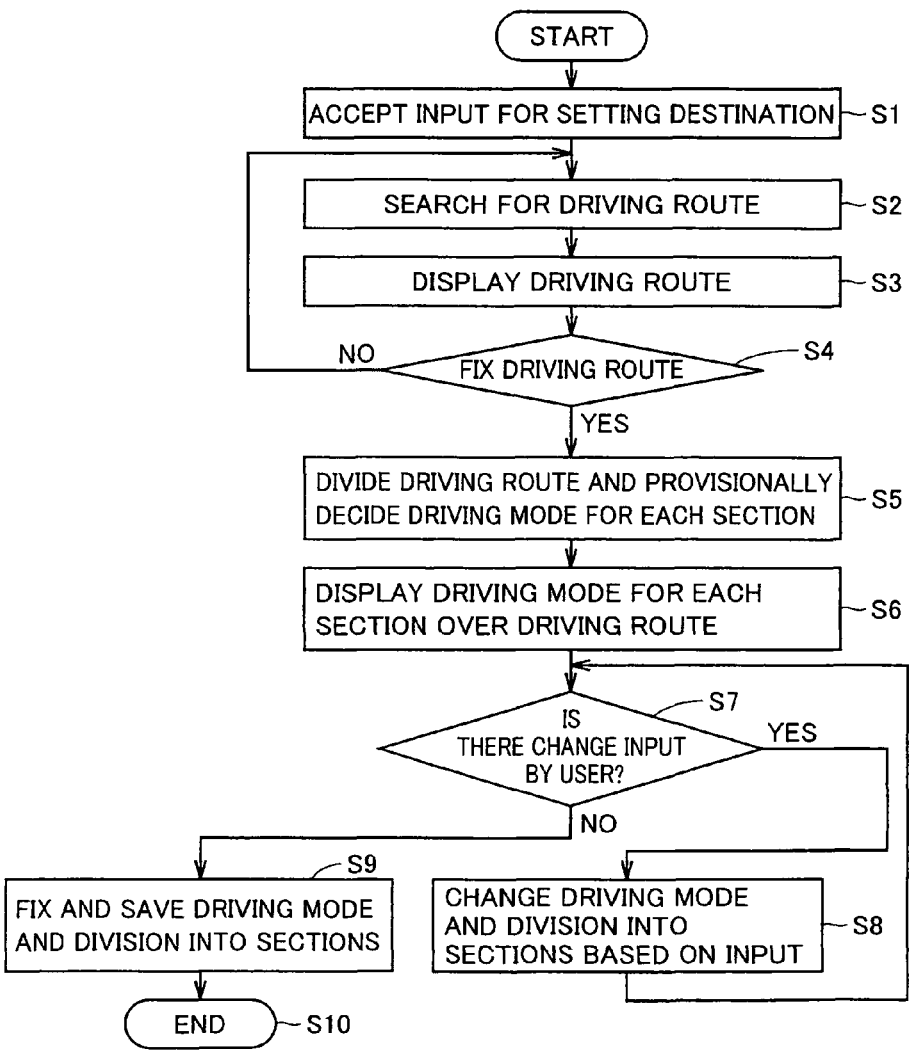
FIG. 4 is a flowchart illustrating a control structure of a process executed by control device 14.

FIG. 4 is a flowchart illustrating a control structure of a process executed by control device 14. Although this process is executed in navigation control portion 64 in the vehicle, this process may be performed in advance before the driver rides in the vehicle by car navigation system software installed on the personal computer outside the vehicle.

Referring to FIG. 4, upon initiation of the process, a process of accepting an input for setting a destination for which the vehicle is headed is first performed in a step S1. In the case where the operation is carried out in the vehicle, the operator sets the destination by operating the touch display at display portion 48 in FIG. 2. In the case where the operation is carried out with the personal computer at home or the like outside the vehicle, the operator sets the destination by operating an input device such as a mouse or a keyboard.

Then, in a step S2, a driving route from the current position of the vehicle (or the position of the home) to the destination is searched for. Then, in a step S3, a process of displaying the obtained driving route on a screen is performed.

In a step S4, an input for fixing the driving route is awaited. The input for fixing the driving route may be provided, for example, by pressing a "guide start" button displayed on a touch panel. The driving route may be fixed also when a certain period of time elapsed without pressing a "search again" button and carrying out any operation. If a request to search for the driving route again is issued in step S4, the process is returned from step S4 to step S2. At this time, a step of setting a transit point or the like may be provided.

If it is determined that the driving route has been fixed in step S4, the process proceeds to a step S5.

In step S5, a process of dividing the obtained driving route is performed. In a step S6, a process of displaying a driving mode for each divided section over the driving route is performed.

It should be noted that only the process of dividing the driving route may be performed in step S5 and the driving mode may be selected by the user in a following step S7. In this case, the driving route may simply be divided at fixed intervals.

Figure 5:
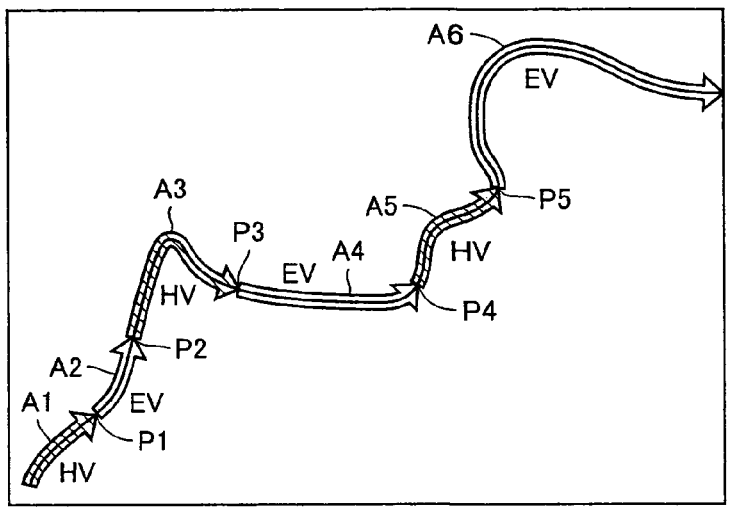
FIG. 5 is a diagram of a situation where a driving mode for each section is displayed over an obtained driving route.

FIG. 5 is a diagram of a situation where the driving mode for each section is displayed over the obtained driving route.

A screen shown in FIG. 5 is displayed on display portion 48 in FIG. 2 in the case where the operation is carried out in the vehicle, and is displayed on the display of the personal computer in the case where the operation is carried out with the personal computer outside the vehicle.

As shown in FIG. 5, the driving route is divided at points P1-P5 into sections A1-A6. Sections A1, A3 and A5 are sections where the driving mode is set to the HV driving mode. Sections A2, A4 and A6 are sections where the driving mode is set to the EV driving mode.

For example, the driving mode is set to the EV driving mode in sections where quiet driving is desired, such as in section A2 where a school is located in the neighborhood and in section A4 where a residential area is located. On the other hand, the driving mode is set to the HV driving mode when heavy loads are applied to the vehicle, such as in section A3 where a steep mountain road or a highway is located. If the vehicle is driven only in the EV driving mode, state of charge SOC of the battery is lowered. Therefore, in order to maintain the battery in the appropriate state of charge, the driving mode may be set such that the EV driving and the HV driving are alternately repeated in consideration of the distance covered or inclinations of roads.

Referring again to FIG. 4, following the process of displaying a driving mode in step S6, it is determined in step S7 whether there is a change input by the operator or not.

Figure 6:
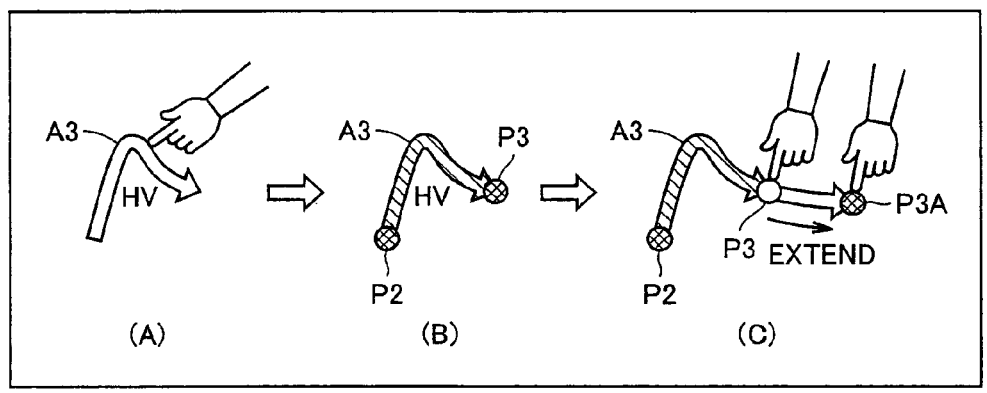
FIG. 6 is a diagram of an example of a change input in a step S7 in FIG. 4.

FIG. 6 is a diagram of an example of the change input in step S7 in FIG. 4.

FIG. 6(A) shows that section A3 that is obtained as a result of division in FIG. 5 and of which driving mode is displayed is touched by a finger in the case of the touch display or clicked in the case of the mouse, to select this section.

Then, as shown in FIG. 6(B), section A3 as well as points P2 and P3 are highlighted and it is indicated to the operator that section A3 has been selected.

Then, as shown in FIG. 6(C), the operator can extend section A3 by touching point P3 and moving the contact point along the driving route to a point P3A.

Figure 7:
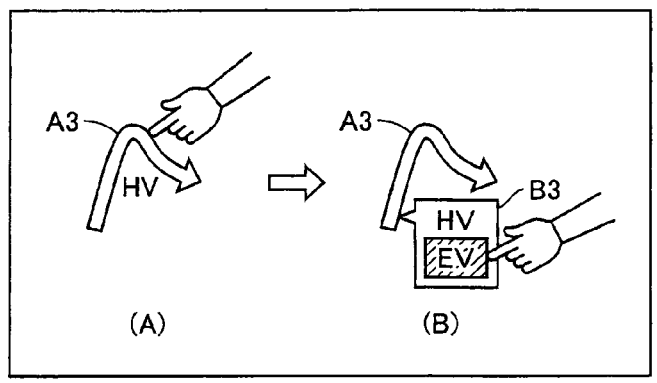
FIG. 7 is a diagram of another example of a change input in step S7 in FIG. 4.

FIG. 7 is a diagram of another example of the change input in step S7 in FIG. 4.

FIG. 7(A) shows that section A3 that is obtained as a result of division in FIG. 5 and of which driving mode is displayed is touched by a finger in the case of the touch display or clicked in the case of the mouse, to select this section.

Then, as shown in FIG. 7(B), a popup display B3 that allows selection of the driving mode for section A3 appears. The operator can change the driving mode for section A3 from the HV mode to the EV mode by pressing an "EV" button in the popup display. It should be noted that the driving mode may be selected for each section by the user as shown in FIG. 7(B) instead of being provisionally decided at the time of division.

Referring again to FIG. 4, in a step S8, division into sections and the driving mode is changed based on the input by the operator in step S7, and the process is again returned to step S7.

On the other hand, if there is no change input in step S7, the process proceeds to a step S9. For example, in the case where a button such as a "driving start" button on the touch display is pressed, in the case where the change input operation is not carried out for a certain period of time, in the case where the vehicle starts moving without the change input operation, or the like, it is determined that there is no change input by the user in step S7, and the process proceeds to step S9.

In step S9, a process of fixing the driving mode and the division into sections as well as a saving process of saving information about the fixed driving mode and the fixed division into sections in a hard disk, memory or the like are performed.

In a step S10 following step S9, the process of this flowchart ends.

As described above, a vehicle control method having the HV driving mode in which operation of the internal combustion engine is permitted and the EV driving mode in which the vehicle is driven by using the motor with the internal combustion engine stopped is disclosed in FIG. 4. The control method includes the steps of: setting the destination (S1); setting the driving route from the starting point to the destination (S4); dividing the driving route and associating any of the driving modes with each section of the divided driving route (S5); fixing the division of the driving route and the driving mode associated with each section based on the instruction from the operator (S7); and causing the vehicle to travel each section in the associated driving mode (S23). The step of causing the vehicle to travel will be described hereinafter.

Figure 8:
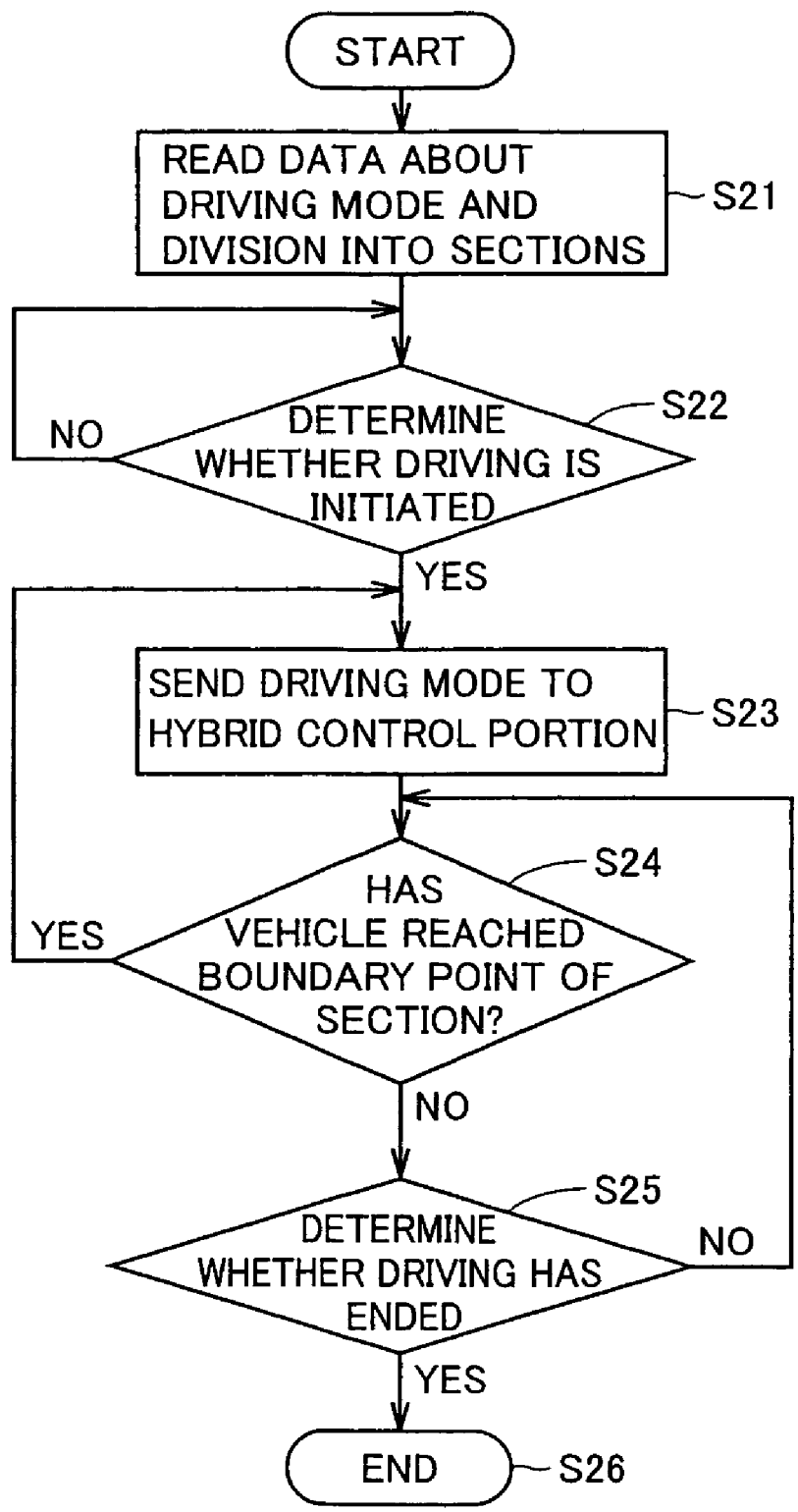
FIG. 8 is a flowchart of a process executed in a navigation control portion 64 when a vehicle is driven.

FIG. 8 is a flowchart of a process executed in navigation control portion 64 when the vehicle is driven.

Referring to FIG. 8, upon initiation of the process, data about the driving mode and the division into sections is first read in a step S21. This data about the driving mode and the division into sections is data saved in the process in step S9 in FIG. 4. In the case where the process of the flowchart in FIG.

4 is performed in the vehicle, this data is read from a built-in hard disk drive or memory. On the other hand, in the case where the process of the flowchart in FIG. 4 is performed in the personal computer or the like outside the vehicle, the data is read from the personal computer or the like via the memory card, a communication line or the like.

Then, in a step S22, a process of determining whether driving has been initiated or not is performed. For example, if the "driving start" button on the touch display is pressed or the driver presses the accelerator pedal after the process in step S21, it is determined that driving has been initiated and the process proceeds from step S22 to step S23.

In step S23, navigation control portion 64 sends information indicating the driving mode corresponding to the current position of the vehicle to hybrid control portion 62. If the sent information indicates the HV driving mode, hybrid control portion 62 causes the vehicle to travel with operation of the engine permitted. On the other hand, if the sent information indicates the EV driving mode, hybrid control portion 62 causes the vehicle to travel, in principle, with operation of the engine prohibited.

As previously described, the EV driving mode is automatically cleared when any of the following conditions is satisfied: 1) EV priority switch 46 is turned off, 2) state of charge SOC of battery B decreases below a prescribed value; 3) vehicle speed V exceeds a prescribed value; and 4) accelerator opening degree Acc exceeds a defined value, and operation of the engine is permitted.

It should be noted that a plurality of EV driving modes may be provided such that a mode having strict clear conditions (a mode in which the engine is started up readily) is defined, for example, as a first EV driving mode and a mode having loose clear conditions (a mode in which the engine is not started up readily) is defined, for example, as a second EV driving mode, and a mode may be selected and set for each section that the vehicle travels.

Furthermore, in the case where navigation control portion 64 outputs a signal that replaces EV priority switch 46 in FIG. 2, operation of EV priority switch 46 by the driver may also allow forceful change of the driving mode.

Then, in a step S24, information about the current position of the vehicle and information about the boundary point of the section are compared, and it is determined whether the vehicle has reached the boundary point of the section or not. A case where the vehicle reaches the boundary point of the section means a case where the current position of the vehicle comes to point P1 if the vehicle travels section A1 in FIG. 5, or a case where the current position of the vehicle comes to point P2 if the vehicle travels section A2, or the like.

In such a case, the process is returned from step S24 to step S23, and a notification about a driving mode for a section to be traveled from now on is provided from navigation control portion 64 to hybrid control portion 62.

If the vehicle is still on the way and has not yet reached the boundary point, the process proceeds from step S24 to a step S25. In step S25, it is determined whether driving has ended or not. For example, in the case where the current position of the vehicle comes to the set destination, in the case where a "guide stop" button on the touch panel of the car navigation is pressed, or the like, it is determined that driving has ended, and the process ends in a step S26. If it is not determined that driving has ended in step S25, the process in step S24 is again executed and monitoring of whether the current position of the vehicle comes to the boundary point of the section or not is continued.

As described above, in the hybrid vehicle of the present embodiment, all driving modes can be automatically decided.

In addition, drivers can customize the driving modes in accordance with their preferences. In particular, in the case where the vehicle repeatedly travels the same route, such as commuting or transportation of baggage, actual fuel efficiency during current driving has only to be compared with fuel efficiency during previous driving. As a result, awareness of the drivers about energy conservation is raised and the drivers can try various driving modes. Therefore, enhancement of fuel efficiency can also be expected.

Although FIG. 2 illustrates an example in which EV priority switch 46 is provided, EV priority switch 46 may not necessarily be provided. The driving mode may be decided based only on a signal sent from navigation control portion 64.

Although it has been described that the driving mode is decided at navigation control portion 64, the present invention may be modified such that navigation control portion 64 provides information about the current position of the vehicle and information about the driving route, and the hybrid control portion divides the driving route into sections and decides the driving mode.

Furthermore, the control method disclosed in the above embodiment can be executed by software by using a computer. A program for causing the computer to execute this control method may be read from the recording medium (a ROM, a CD-ROM, a memory card, or the like) having the program computer-readably recorded thereon into the computer in the vehicle control device, or may be provided via the communication line.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A vehicle control device having a plurality of driving modes, comprising:
   a destination setting portion setting a destination;
   a route setting portion setting a driving route from a starting point to the destination;
   a driving route dividing portion dividing the driving route into sections;
   a driving mode fixing portion fixing a driving mode by associating any of the driving modes with each of the sections of the divided driving route, based on an instruction from an operator; and
   a driving control portion causing a vehicle to travel each of the sections of the divided driving route in the associated driving mode,
   the driving route dividing portion dividing the driving route from the starting point to the destination into sections appropriate for each of the plurality of driving modes and provisionally deciding a driving mode for each of the sections of the divided driving route, and
   the driving mode fixing portion changing the driving mode associated with each of the sections of the divided driving route into another driving mode based on the instruction from the operator.

2. The vehicle control device according to claim 1, wherein
   the vehicle is a hybrid vehicle driven by using an internal combustion engine and a motor, and
   the plurality of driving modes include
   an HV driving mode in which operation of the internal combustion engine is permitted, and
   an EV driving mode in which the vehicle is driven by using the motor with the internal combustion engine stopped.

3. The vehicle control device according to claim 1, further comprising:
an information reading portion reading information including the destination, the driving route, each of the sections of the divided driving route, and the driving mode associated with each of the sections of the divided driving route from outside the vehicle, wherein
the driving control portion is configured such that the vehicle can travel based on the information.

4. The vehicle control device according to claim 1, wherein the vehicle includes a display portion displaying the driving route, and
the driving mode fixing portion causes the driving mode associated with each of the sections of the divided driving route and another driving mode to pop up on the display portion based on the instruction from the operator specifying any of the sections of the divided driving route, and changes the driving mode based on a mode selection instruction from the operator.

5. The vehicle control device according to claim 1, wherein the vehicle includes a display portion displaying the driving route, and
the driving mode fixing portion changes a position of a selected boundary point at which the driving route is divided, based on an input by the operator for selecting the boundary point displayed on the display portion at which the driving route is divided, and moving the boundary point along the driving route.

6. A vehicle control device having a plurality of driving modes, comprising:
means for setting a destination;
means for setting a driving route from a starting point to the destination;
means for dividing the driving route into sections;
means for fixing a driving mode by associating any of the driving modes for each of the sections of the divided driving route, based on an instruction from an operator; and
means for causing a vehicle to travel each of the sections of the divided driving route in the associated driving mode,
the means for dividing the driving route dividing the driving route from the starting point to the destination into sections appropriate for each of the plurality of driving modes and provisionally deciding a driving mode for each of the sections of the divided driving route, and
the means for fixing a driving mode changing the driving mode associated with each of the sections of the divided driving route into another driving mode based on the instruction from the operator.

7. The vehicle control device according to claim 6, wherein the vehicle is a hybrid vehicle driven by using an internal combustion engine and a motor, and
the plurality of driving modes include
an HV driving mode in which operation of the internal combustion engine is permitted, and
an EV driving mode in which the vehicle is driven by using the motor with the internal combustion engine stopped.

8. The vehicle control device according to claim 6, further comprising:
means for reading information including the destination, the driving route, each of the sections of the divided driving route, and the driving mode associated with each of the sections of the divided driving route from outside the vehicle, wherein
the means for causing a vehicle to travel is configured such that the vehicle can travel based on the information.

9. The vehicle control device according to claim 6, wherein the vehicle includes means for displaying the driving route, and
the means for fixing a driving mode causes the driving mode associated with each of the sections of the divided driving route and another driving mode to pop up on the means for displaying based on the instruction from the operator specifying any of the sections of the divided driving route, and changes the driving mode based on a mode selection instruction from the operator.

10. The vehicle control device according to claim 6, wherein
the vehicle includes means for displaying the driving route, and
the means for fixing a driving mode changes a position of a selected boundary point at which the driving route is divided, based on an input by the operator for selecting the boundary point displayed on the means for displaying at which the driving route is divided, and moving the boundary point along the driving route.

11. A vehicle control method having a plurality of driving modes, comprising the steps of:
setting a destination;
setting a driving route from a starting point to the destination;
dividing the driving route into sections;
fixing a driving mode by associating any of the driving modes for each of the sections of the divided driving route, based on an instruction from an operator; and
causing a vehicle to travel each of the sections of the divided driving route in the associated driving mode,
in the step of dividing the driving route, the driving route from the starting point to the destination being divided into sections appropriate for each of the plurality of driving modes and a driving mode for each of the sections of the divided driving route being provisionally decided, and
in the step of fixing a driving mode, the driving mode associated with each of the sections of the divided driving route being changed into another driving mode based on the instruction from the operator.

12. The vehicle control method according to claim 11, wherein
the vehicle is a hybrid vehicle driven by using an internal combustion engine and a motor, and
the plurality of driving modes include
an HV driving mode in which operation of the internal combustion engine is permitted, and
an EV driving mode in which the vehicle is driven by using the motor with the internal combustion engine stopped.

13. The vehicle control method according to claim 11, further comprising the step of
reading information including the destination, the driving route, each of the sections of the divided driving route, and the driving mode associated with each of the sections of the divided driving route from outside the vehicle, wherein
in the step of causing a vehicle to travel, the vehicle is caused to travel based on the information.

14. The vehicle control method according to claim 11, wherein
the vehicle includes a display portion displaying the driving route, and
in the step of fixing a driving mode, the driving mode associated with each of the sections of the divided driving route and another driving mode is caused to pop up on the display portion based on the instruction from the operator specifying any of the sections of the divided driving route, and the driving mode is changed based on a mode selection instruction from the operator.

15. The vehicle control method according to claim 11, wherein the vehicle includes a display portion displaying the driving route, and in the step of fixing a driving mode, a position of a selected boundary point at which the driving route is divided is changed based on an input by the operator for selecting the boundary point displayed on the display portion at which the driving route is divided, and moving the boundary point along the driving route.

16. A computer-readable recording medium having a program for causing a computer to execute the vehicle control method according to claim 11 recorded thereon.

* * * * *